United States Patent [19]
Bullard et al.

[11] 3,731,191
[45] May 1, 1973

[54] MICRO-MINIATURE PROBE ASSEMBLY

[75] Inventors: Robert L. Bullard, Poughkeepsie; Donald C. Wheeler, LaGrangeville, both of N.Y.

[73] Assignee: International Business Machines Corporation, Armonk, N.Y.

[22] Filed: Dec. 22, 1969

[21] Appl. No.: 887,229

[52] U.S. Cl. ............ 324/158 F, 324/72.5, 324/158 P
[51] Int. Cl. ............................................. G01r 31/02
[58] Field of Search ....................... 324/158 P, 158 F, 324/158, 72.5

[56] References Cited

UNITED STATES PATENTS 2,954,521   9/1960   McKee ............................ 324/72.5

OTHER PUBLICATIONS

Beauregard et al.; High–Speed Multiprobe . . . ; IBM Tech. Dis. Bulletin; Vol. 8; No. 8; January 1966; pg. 1144.

*Primary Examiner*—Rudolph V. Rolinec
*Assistant Examiner*—Ernest F. Karlsen
*Attorney*—Hanifin and Jancin and John S. Gasper

[57] ABSTRACT

This invention is directed to a multi-probe test circuit assembly particularly adapted for producing low resistance electrical connections to a semi-conductor component of which the electrical parameters are to be evaluated.

1 Claim, 6 Drawing Figures

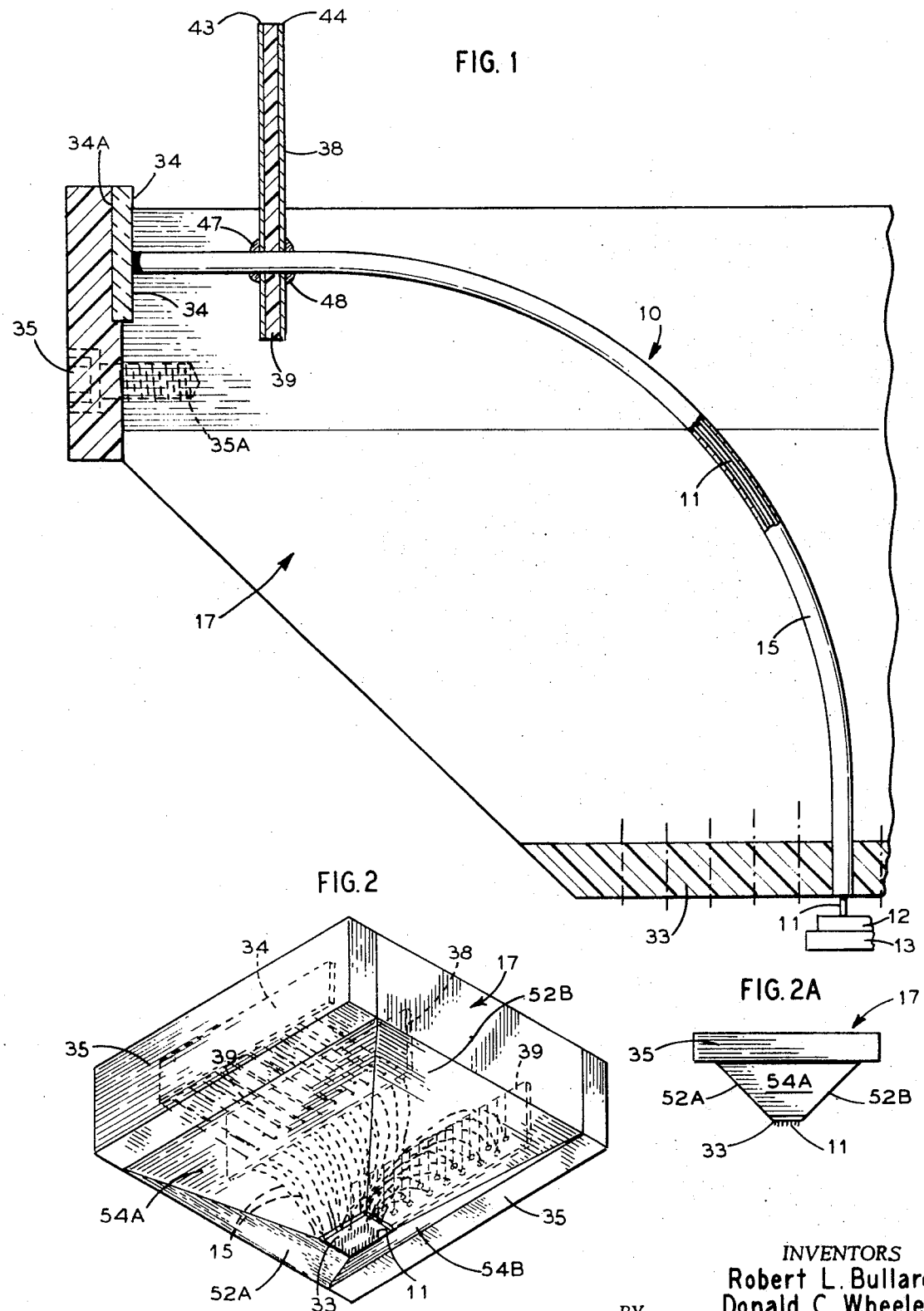

MICRO-MINIATURE PROBE ASSEMBLY

This invention relates generally to electrical circuitry particularly adapted to the evaluation of selected parameters of such circuitry. It is specifically directed to a form of contacting apparatus containing a multiplicity of probes capable of being closely spaced which makes it possible to measure the parametric and functional performance of a complete circuit or system of circuits or selected parts thereof.

The invention in further detail is particularly concerned with assemblies of probes for electrical testing of semi-conductor devices, parts of such devices, circuits containing such devices, packages containing such devices or circuits, as well as related electrically conducting or insulating parts.

In one of its preferred forms the invention is directed to a structure which will provide plural simultaneous and temporary low resistance electrical connections between semi-conductor devices or the like and an external circuit whenever all or selected probes of the multiplicity of the assembly are permitted to contact surfaces of such devices which may or may not have a uniform thickness or smoothness. Such a surface may include the terminal areas of a semiconductor wafer or portion thereof, or of a separate semiconductor chip to be tested, although the pattern of said areas need not necessarily be regular.

In the past, many efforts have been made to achieve such a result, for instance, in respect of the testing of chips formed as a part of wafer structures which have been formed as a result of suitable and well known sputtering or distillation action within a housing by various processes or doping, which need not here be discussed. The logic chips or other semiconductor chips which are desired for testing by way of the temporary but simultaneously or temporarily provided electrical contacts are usually supported on a housing. One or more probe elements, together with positioning devices for each probe element are customarily arranged to provide a conducting path between the chip element itself and some suitable panel which will lead to an external test circuit. In the foregoing the reference to the wafer or chip as the element to be contacted should be viewed as purely illustrative since the principles here to be defined have wide application.

Many of the prior art devices have been quite complex. The time consumed for establishing and testing the electrical properties of the semiconductor chips to be so tested was long and the effort was often tedious. Each probe element generally required individual adjustment in three dimensions, was not readily locked in position and was easily disturbed by accident or through use. Due to the bulkiness of the probe elements together with the means of support therefor, the quantity of such probes was often limited to less than the number of terminals associated with a chip, thus necessitating much additional effort to adequately test the chip. Consequently, the tests were often very expensive. The structure which is herein to be described will be described in connection with wafers or chips to be tested which is one type of application by which it becomes possible to make a full and accurate disclosure of the inventive merits and also to provide for a test of complex logic or memory functions at a substantial number of points (without separate adjustments) on the chip simultaneously without fear of interference, or either capacitive or conductive connection, between the different elemental regions of the contacted element.

In accordance with this invention a contact apparatus is provided in which a plurality of probe elements are fixedly held by a common support housing in a fixed array corresponding with the terminal contact pattern of the circuit device to be engaged for testing. Essentially the probe elements comprise individual tubular probe guides with individual probe wires or the like removably contained and compressible within the probe guides. Fixation of the probe elements in the desired array is provided by an encapsulation housing including a support plate portion of the support housing having a plurality of openings arranged to correspond with the test contact pattern of the circuit device. One end of each of the tubular probe guides is attached to the support plate within the plate openings while the other end is held within the housing preferably adjacent and in abutment with a pressure plate opposite the remote ends of the probe guides. The probe wires are designed such that when fully inserted within the probe guide, they extend a controlled amount beyond the end of the housing support plate while the remote ends of the probe wires abut the pressure plate.

In the context of this invention the tubular probe guides are high conductivity material while the probe wires are conductive material having high resistance to abrasive wearing. It is a distinctive feature of this invention that the electrical circuit continuity is made by surface contact of the probe wires within the probe guides which are in turn connected to external connector boards or the like mounted on the housing and having provision for connection to external test circuits or the like. Further, the probe guides are preferably curved between their ends within the housing. Thus, when contact is made with a test terminal, the probe wires have a springlike quality and are compressible within the probe guides, the curvature and spring-like qualities of the probe wires causing electrical contact to occur very close to the contact end of the probe guide. Thus, only a short length of the relatively high resistance probe wire is in the electrical circuit while the high conductivity probe guide acts as the principal electrical connection with the external circuits. Since the probe guides and probe wires are conductive, the contact apparatus is essentially made of dielectric materials, particularly the support plate and the pressure plates. In addition, the probe guides are completely encapsulated within a dielectric material so that the probe elements are mutually electrically insulated as well as being held rigidly in position.

With the above structure contact probe apparatus has been made with probe wire separations in the order of 6-8 mils. Probe contact wires may be smaller than 2 mils in diameter.

Such a contact apparatus where minute size chips are to be tested is, of course, so arranged that when it is placed adjacent to any chip the longitudinal direction at the chip is such that the applied force is caused to be as close to normal to the chip surface as possible. The self-springing action of each individual probe wire is provided by its longitudinal compressibility. The force of the probe wire on the contacted region is so small that as a maximum it could produce only minimal damage to hard terminal areas (such as aluminum) or soft materials (such as lead). A minimal elasticized resistance of the contacts is assured.

With the probe wire so positioned within its conducting guide, there is inherently built into the apparatus the opportunity for the probe to be almost automatically adjusted independently of the pressure which the probe exerts on the surface it contacts, which, of course, is the surface to be tested. It likewise makes the contact independently of the reaction pressure upon the probe which thus tends to make the precise contact location as close to independent of the angle of incidence at which the probe makes contact as is possible. The self-springing action of the probe wire is one of the distinguishing and important features of this invention and minimizes variations in electrical contact resistance between probe elements and chip contacts.

When the invention is utilized, all of the probe wires and their outer conducting guides are brought from a circuit board through an outlet holder which functions to connect the probe elements to external circuits. Usually, the measured electrical effects are then obtained by the more or less common two-wire type of Kelvin connection to each probe guide while maintaining the electrical isolation between the probes. In this description the Kelvin connection, being so well known, will not be outlined in detail other than to state that it has been described in one form in the text "Basic Electrical Measurements" by M. B. Stout, published by Prentiss-Hall in New York in 1950, and particularly at page 80 of this text and in the paragraphs identified at 4–21 and 4–22. Likewise, a generally similar type of connection was explained by C. L. Dawes in the publication "Electrical Engineering, Direct Current," Volumen I, published by McGraw-Hill in New York in 1937, with this descriptive material appearing at page 171, particularly in its paragraph numbered 120.

Generally speaking, in connection with the testing of semiconductor chips, the currents are quite small and generally of the order of 0.1 amperes and the voltages are usually less than 10.0 volts. There is a series path between the test equipment and the semiconductor chip which may include at times up to about 15 ft. of wire together with the contacts of several connectors. The resistance is but a few ohms which, of course, can vary from path to path and at times becomes significant. In the testing, the probe assembly and the external circuitry is designed to allow the use of a feedback loop when forcing an electrical function in the chip by the external circuitry. The design also allows for sensing and measuring a voltage or current at the chip by providing a minimum resistant path between the chip and the measurement device. Any voltage which is reflected into this path in the measurements constitutes an error. Manipulation of the resistance is achieved through the use of a two-wire connection, which accommodates both the forcing and measuring functions, and through the stated connections which will be later further mentioned and explained.

With these thoughts in mind, the invention has as one of its main and principal objects that of providing a probe wire and a probe guide construction which is flexible, so that the structures within the assembly can be fanned out from the chip with the arc of curvature being very large and often as great as 90°, so that connection to a relatively bulky cable can readily be made.

The invention also has as one of its main and principal objects that of providing improved electromechanical testing means adapted to the expanded possibilities of electrical circuit systems, and of electrical testing systems.

A further object of the invention is to provide simplified means for the mutual contacting of devices or device terminals, as well as for the electrical connections to electrical testing systems.

It is a further object to provide means for the simultaneous temporary contacting of many device structures or device terminals which may have nonuniform thickness when mounted in a test carrier; and for the mutual contacting of device terminals which may be essentially in a plane or may project above or out from devices and have irregular surface shapes; and for the mutual contacting of devices or device terminals which may be very closely spaced, but may not be necessarily in a regular pattern, nor essentially constrained to the periphery of the devices, and which may be very small in size; and for the mutual contacting of devices or device terminals without causing significant damage such as elongated scratches to the device terminals or damage to the device structure, and without the necessity for large contact areas on the devices.

A further object is to provide a multiplicity of simultaneous and temporary very low-resistance electrical connections between devices or device terminals, and the electrical testing system; and to provide such connections, (as already suggested), essentially without capacitive or conductive connections between the different contacting elements of the invention.

Another object is to facilitate the improved mutual contacting, and the movement or other manipulations of devices, wires, and other units involved in the testing so that all operations auxiliary to the actual electrical testing can be performed by means of a minimum number of operations, either automatic or manual, and if manual, to eliminate the need for high operator skill levels and to insure improved rapidity in forming the contacts to the devices through precise registration of contacting members relative to each other, and relative to the pattern of device terminals to be contacted.

It is a further object to offset such factors as surface oxidation, or corrosion, or other surface contamination of the device terminals as well as the hardness of the material utilized in forming the device terminals by controlling probe tip shapes in consonance with the properties of the terminal materials and surfaces.

It is a further object to provide a simplified and rapid means of providing multiple connections between any one of various patterns of devices or device terminals, and the electrical test system through easy interchangeability of contacting or probe assemblies, or by addition or removal of probe elements from such assemblies.

It is a further object to provide a contacting apparatus which is easily maintained, and the contacting members or probes of which are readily replaceable (and wherein different probe elements can be used for different purposes or as replacements).

The invention has as one of its further main and principal objects that of providing a configuration of probe structures within the probe assembly which maximizes the desired space-expander effect, and which aids materially in reducing the coupling of electrical signals between the probe structures. This is accomplished by providing a probe and probe-guide construction which is flexible, so that the structures within the assembly can be fanned out in a direction from the device or device terminals toward edge connectors contained within the apparatus, and with the arc of curvature of the structures being very large and often as great as 90°.

It is a further object to provide reliable and reproduceable multiple connections which are of very low electrical resistance, while successively contacting many devices or terminals.

Still a further object is to provide a means for low-resistance connections between the probe structures within the assembly, and the electrical testing systems irrespective of the direction of signal transmission.

It is a further object to provide within each probe structure self-springing action for each probe by the longitudinal compression thereof.

It is a further object to provide a simplified means for placing in close proximity to the device or of device terminals, electric circuit systems, circuits or components thereof which will facilitate the test of such devices.

Further than this, it is an object of the invention to provide a structure which will withstand the compressive stress resulting from any encapsulating process in the holder and still allow the probes which are positioned within the conducting guide elements to function and yet to be capable of replacement at any time or for any reason for which replacement may be found desirable.

A further object of the invention is that of providing a group of probe wires in a completed and extremely small area assembly where the probes are extended through conductive guides and yet terminate generally in a plane so that simultaneous, but generally temporary, contact can be made to all points which are substantially in a common plane on the wafer or chip to be tested. The arrangement of planarity is easily achieved readily by a suitable polishing process. This is done either through the controlled utilization of thermal coefficient of expansion for the assembly or the removal of the spacers at outboard ends of the probes.

A further object of the invention is that of providing an assembly in which through a window-like area, it is possible to provide and permit optical registration of the probes to the terminals of the semiconductor wafer or chips. At the same time, a slot is machined in the assembly and is arranged to terminate at the window and thereby permit the use of externally mounted chip marking devices of any desired type or form.

A further object of the invention is that of providing a mounting construction which is usable for movement over a great many chip areas on a wafer for testing. This is achieved as a general rule by the use of an optical observation mechanism in combination with a suitable form of arrangement to obtain generally a three-dimensional movement of the probe assembly in relation to the chip areas.

All of the foregoing and other objects, features and advantages of the invention will, of course, become more apparent from the following more detailed and particular description of a preferred embodiment of the invention, as it has been illustrated by the accompanying drawings, in which:

FIG. 1 is a sectional view of a simplified structure which exemplifies a contact apparatus comprising a probe wire positioned within a conducting probe guide and held within a support into which the conducting guide is adapted to be permanently fixed and from which conducting guide connections may be made to outer external circuits and wherein all the probe elements in the final assembly will be enclosed by an encapsulating material;

FIG. 2 is generally an isometric or perspective view of a contact apparatus in accordance with this invention having a multiplicity of probe elements carried out through encapsulating material to suitable terminal boards for connection to an external circuit; and FIG. 2A is an end elevation view of the FIG. 2 structure;

Figure 4:
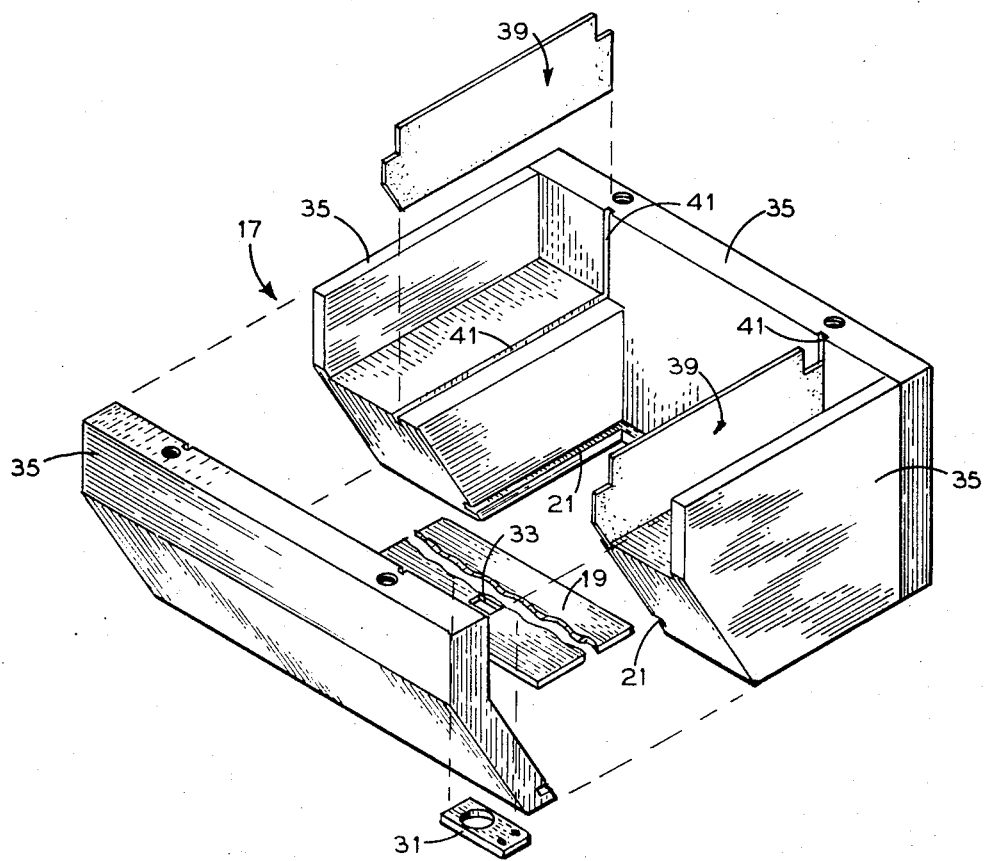
Figure 5:
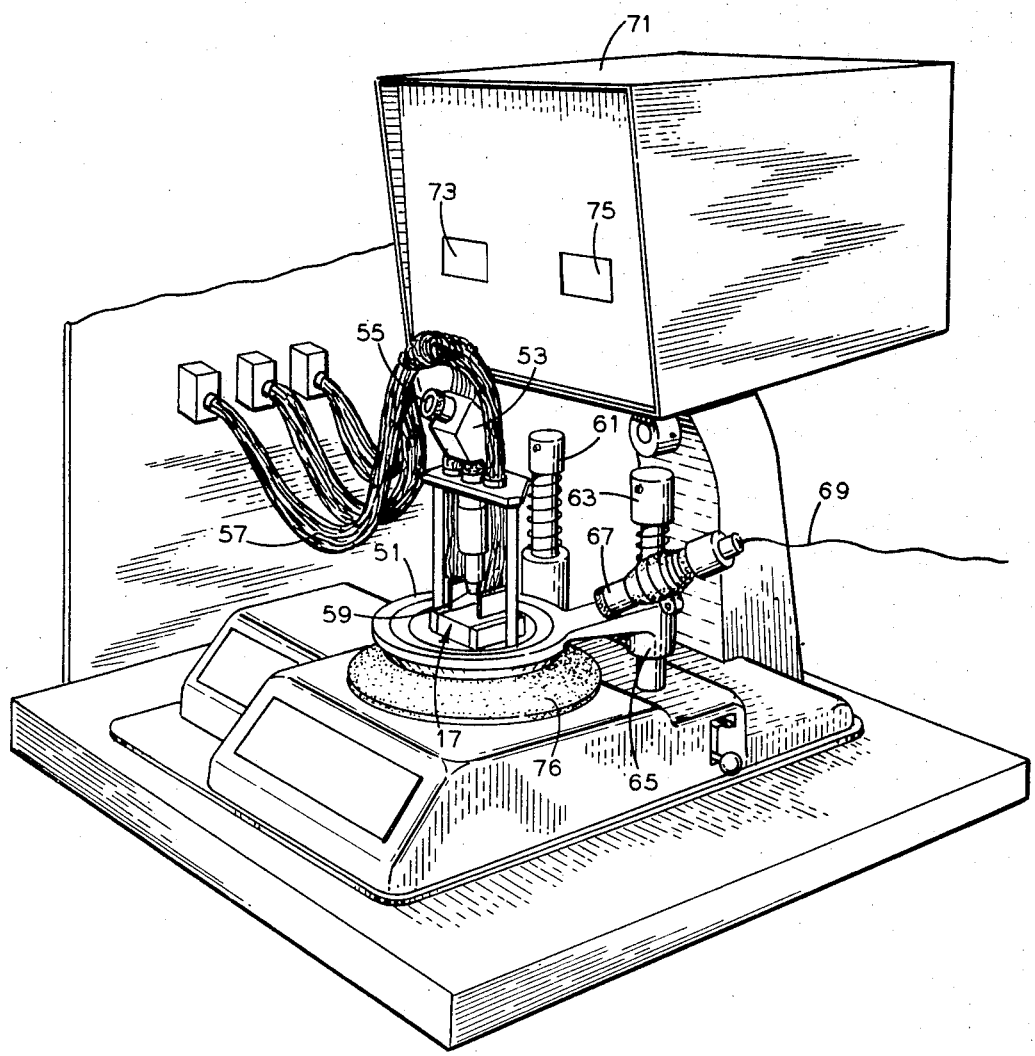

FIG. 4 is a perspective and exploded view of the basic housing structure prior to assembly of the probe elements and encapsulation therein, with the box-like holder element being shown separated into its different component parts prior to having the conducting guides of the probe elements positioned therein and prior to being filled with a guide-positioning molding compound; and FIG. 5 is a schematic view of one form of test stand generally illustrating the use of a test probe device of FIG. 2, as it is positioned adjacent to a wafer so that a chip area may be tested.

Reference now may be made to the drawings and first to FIG. 1 thereof. A probe element which is adapted to contact the upper surface of a terminal area 12 of an element 13 to be tested is shown at 10. The probe wire 11 itself is shown as being positioned internally of a tubular conducting probe guide 15 that is arranged to be held and located within a housing 17 of the type illustrated in assembled form in FIG. 2. Such housing 17 is preferably truncated as a matter of convenience. The probe wire 11 extends through a central opening within the tubular guide 15 and extends into the guide for the total length of the guide and into abutment with pressure plate 34. The guide 15 is generally fixedly mounted within the housing 17 (as will later be described) so as to be incapable of moving therein, although the probe wire 11 itself is somewhat loosely mounted so that as pressure is applied to its extended end which contacts any adjacent surface of the area 12 to be tested, the probe wire 11 will be longitudinally compressed within the guide 15.

It will be noted from FIG. 1 that probe element 10 is curved between support plate 33 and pressure plate 34. Because of this curvature, contact between probe wire 11 and tubular guide 15 is very close to the extended tip of probe wire 11. This is true notwithstanding that no pressure is applied longitudinally to the end of probe wire 11. Maintenance of the contact of wire 11 and guide 15 is assured during use because of the longitudinal compressability of wire 11. This assures that only a very short length of probe wire 11 is in the electrical circuit. Due to the compressability of wire 11, variation, in the planarity of surfaces being contacted is readily compensated for. It is further apparent that wire 11 is readily replaceable by slidably removing it from guide 15.

In a typical example, the housing 17, as shown in assembled form in FIG. 2 is open at both ends and is somewhat in the shape of a truncated pyramid. The probe positioning plate 33 is formed from a plate blank 19 (see FIG. 4). Blank 19 is extremely thin and may be "Plexiglass" stock into which numerous holes are formed in region 33 for receiving the ends of the guides 15 from which the probe wires 11 extend.

As one example, the blank 19 is machined from stock which is about one thirty-second of an inch thick and holes are formed therein in the form of the desired contact pattern. Such holes are usually spaced by 6 mils to 8 mils on centers and the positioning accuracy has been measured to have an accumulative error of not more than 0.5 mils. An additional 0.1 mils per 25 mils is allowed for shrinkage during later curing. The holes through which the guides 15 extend in this particular example are about 5 mils in diameter.

Following drilling, the holes in the plate 19 are then cleaned by any appropriate means, which, for instance, may be a stainless steel wire of about 5 mils in diameter. The positioning accuracy of the various hole locations is then checked. One way of checking is to use of an optical comparator. One suitable checking comparator device is the Bausch and Lomb type 33–12–01 having an accuracy in the range of ±0.1 mils.

After the plate 19 is checked, it is slid into the grooves 21 at the bottom of side panels 35 of the housing 17. Then, when the complete housing 17 is assembled it is securely cemented (as through the use of ethylene dichloride as a cement) or otherwise secured in place. In order that the protruding ends of the probe wire 11 shall not be bent, they are protected during the latter processing steps or when not in use by a cover plate 31 (see FIG. 4) of any desired form held at the bottom of the plate 19 and readily removable when the device is in use.

Reverting now again to FIG. 1, all of the probe wires 11 are generally similar. Each is contained within its own guide 15, which provides a sheathlike casing for the probe wire 11 as well as a low-resistance path and, extends between and through the container bottom insulating plate 33 to the stop plate 34. The remote end of each guide 15 terminates at an insulating stop plate region 34 secured to the insulating wall 35 of the container in a recessed region 34A. At its contact end the probe wire 11 extends about 6 mils from the end of the guide tube 15 through an opening in the central region 33 of plate 19, although this distance can be more or less depending upon use. The stop plate 34 provides resistance to longitudinal movement of the probe wire 11 and aids in giving the probe wire elastic spring action.

As each guide 15 is positioned within the holder 17 it is passed through the opening 37 of the electrical conductor lands 38 which are supported at each side of the insulating panels 39 (connections not shown in FIG. 4 for convenience) which are adapted to fit through slots 41 of the holder 17. Each of the electrical conductors 38 then leads to the outer end of the panel 39 on which it is carried. The conductors 38 (one on each side of each panel 39) lead to contacting points such as 43 and 44 to be mated with matching connectors. These connectors may be of any suitable type such as the type 600–2PC60 made and sold by Continental Connector Corporation of Woodside, New York, has been found particularly adapted to making such electrical connections to the test equipment (not shown).

Each of the guides 15 is of a more or less high electrical conductivity. In one preferred embodiment the probe wire 11 is beryllium-copper and the guide 15 is coin silver. Coin silver is preferred since its conductivity is very close to pure silver and it is better able to stand pressures from the probe wire 11 without deforming. The material of which the probe 11 is formed has both structural rigidity and some elasticity and good wearing properties which are helpful in repeated usage. When each guide 15 is passed through the panels 39 it is connected to each of the conductors 38 (which constitute edge lands) by any usual form of electrical connection, such as solder joints 47 and 48, which provides both for securement and the establishment of a low loss electrical connection between the guide and the conductors or edge lands 38. The probe wire 11 which is mounted internally of the guide 15 functions essentially longitudinally as an individual spring so that the force applied when any external surface is contacted by its end will function to move the probe wire 11 thereby to control its deflection perpendicular to the contacted terminating surface.

In the determination by an electrical measurement of a very small valued (for instance, less than one ohm) resistor, the resistance of the connections between the resistor to be measured, and the bridge used in making the measurements now become particularly significant. In making these measurements the conducting electrical path from the terminal formed between the probe wire 11 and any contacted surface includes the probe, the contact to the guide, the guide 15, and the Kelvin bridge connections 47 and 48 at the edge lands 38. The Kelvin bridge connection is a well known type and, consequently, is not more illustrated in detail, but it has been explained in some detail in the text mentioned earlier in this description. In the circuit of the type here described, where the Kelvin bridge connection is used, the problem has been overcome through the use of two connections for each lead of the resistor.

The type of connection is commonly referred to as a four-terminal connection or a four-point connection.

In instances where semiconductor chips constitute the regions contacted by the probe wire end and thus the area to be tested, it usually happens that the currents seldom exceed 0.1 amperes. The voltages involved are usually less than 3.0 volts and a series path between the test equipment and the semiconductor chip may be of the order of 15 ft. of wire, together with the contacts of the several connectors, the resistance of a few ohms (which varies with time for one path and varies between paths at a given time) becomes significant. In the case here under consideration, the test apparatus being described is capable of applying or fixing an electrical function to an input pad of a chip or the same physical pad (which may be used as an output pad in a different chip type) for the purpose of making the measurement. For the first case, the test apparatus usually allows the use of a feedback or force/sense loop as a part of the mechanism. The force and sense leads for one probe are connected by such connections as shown at 47 and 48 in FIG. 1. Although this is not used for the same purpose, this can be seen to correspond to the double connection at one end of the resistor as above-mentioned.

For the second case mentioned, an output pad of the chip may be sense measured by the test apparatus under which circumstances the pad is extended through several feet of wire and the connectors to the measurement device in the tester. Practical voltage measurement devices require current (form the chip which would be contacted by the probe and as in FIG. 1) for their operation. Under the circumstances, it is necessary to minimize the resistance between the pad and the measurement device because any voltage drop in reducing this path is reflected in the measured value as an error. Minimization of the resistance is accomplished through the use of generally the same physical two wire channel as already described above, but in the second instance type of operation the two wires are electrically connected in parallel, beginning at the points 47 and 48 as depicted by FIG. 1. This type of double connection corresponds to the double connections at one end of the resistor as already discussed, even though it is not used for the same purpose.

Figure 3:
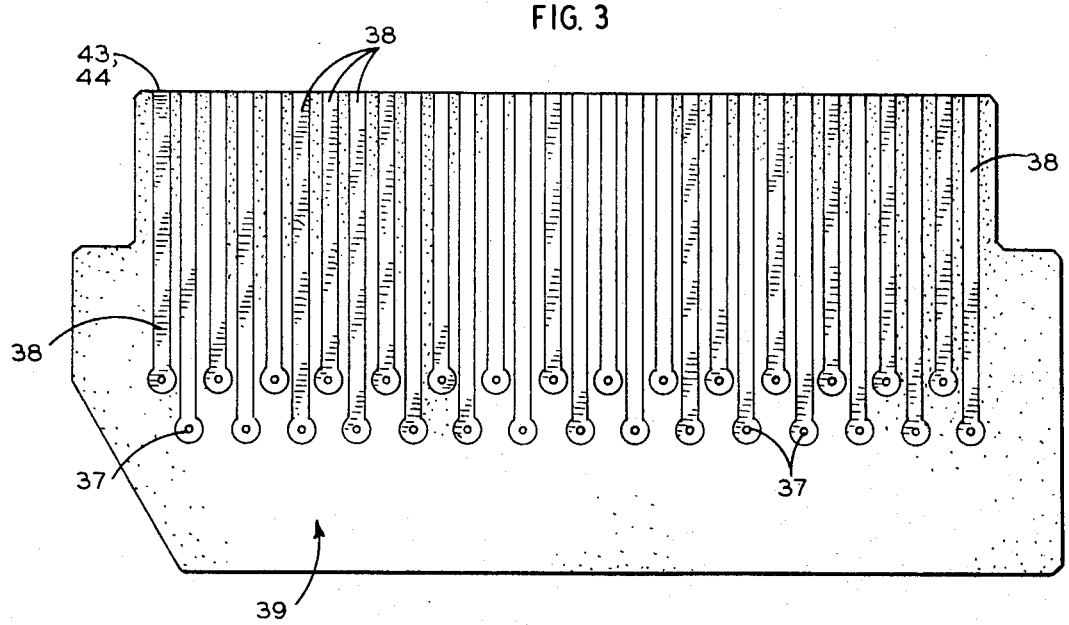
FIG. 3 is a showing of a terminal board of a type suitable for connecting the conducting guides with external circuitry.

Up until this point of the description, detailed mention has not been made that as guides 15 and the internal probe wires 11 are passed through the insulating bottom plate 19 and through the openings 37 in the conductors 38 so that the end of the guide 15 abuts against the stop member 34, the arrangement is preferably fanned out as can be seen schematically from FIG. 2 and as becomes apparent from the arrangement of the connectors or conductors 38 in FIG. 3.

The probe guide 15 with its internal probe wire 11 is so flexible that the structures within the entire assembly can be fanned outwardly from the chip and also curve outwardly through an angle of about as much as 90°, as can be seen from FIG. 2. This configuration for the structure maximizes the desired space expander effect and aids materially in reducing coupling between the probe element 10. Further than this, the flexibility aids greatly when it is borne in mind that after the probe element 10 have been positioned in the fashion above described, and as more particularly shown by FIG. 2, that the components depicted by FIG. 4 in exploded form are brought together and then the complete assembly is encapsulated. Preferably, an encapsulating material known by the trade name "Castolite" is poured into the cavity formed within the housing 17 to some desired depth and cured at room temperature for about 24 hours, after which the process is repeated several times until the final curing, which is at a temperature of about 55°C. This is sufficient to hold all of the guides 15 and the probes 11 positioned internally thereof in fixed position within the container 17 (now assembled as indicated by FIG. 4) and still the structure is so held that the probe wires 11 within the assembly can always continue to function as already described and if necessary they can be replaced at any time. At this time the inwardly turned portions 52a, 52b, 54a, and 54b (FIG. 2) of the frame 36 may be removed. This is not shown since FIG. 4 is an exploded view and shows the structure prior to full assembly and encapsulation.

It was also above intimated that planarity of the probe tips 11 is often required in a completed assembly. This is in order that there can be simultaneous contact to points which are approximately in the same plate. This is readily achieved by an ordinary polishing process and considered in combination with the controlled utilization of the thermal coefficient expansion of the assembly or the removal of the spacers at the outboard ends of the probe wire 11.

For aid in aligning the complete assembly and in viewing the assembly, it is usually desirable that there be formed in the holder a window (not shown) which is produced in the encapsulating process. This is normally done by a flexible conical core and is for the purpose of aiding in the optical registration of the probes to the terminals of the semiconductor chips. Usually a slot can be machined in the assembly and terminate at the window to permit the use of an externally mounted chip marking device such as a scriber or inking pen or something of that order. The registration is schematically depicted by the showing of FIG. 5 where the complete assembly is held by a plate such as 51. The positioning may be checked by the schematically represented objective assembly 53 through the eyepiece 55. The connections 57 shown in FIG. 5 from the upper end of the holder are similar to those which would be made to the ends of the conductors represented in FIG. 3.

Turning now to FIG. 5 of the drawings, the assembled unit 17 with the guides 15 and the protruding probe wires 11 contained therein and entire assembly of the guides 15, the probe wires 11 and the connections made thereto being encapsulated, the complete arrangement is held in the plate 51. The microscopic eye-piece and the optical arrangement (not shown in detail but contained within the assembly 53) and the final terminating eye-piece (not shown) connected to the end frame 59 of the microscopic arrangement is held over and above the housing 17. Positioning of the complete assembly is provided by positioning elements 61 and 63 which are capable of providing vertical movement of the housing, and stage 76 which provides lateral movement of the chip. Thus, with the aid of the objective, the worker is able to make certain that the relative position of the probe wires 11 which extend outwardly from the plate 13 are brought directly over that section of the wafer which it is desired to test and then by means of the adjusting screw schematically shown, the holder 51 held to the screw by the collar or equivalent 65 can be brought down against the wafer or chip section. As this is occurring, the housing 17 is illuminated by any suitable form of light source such as that schematically illustrated at 67 and connected to an external current supply by way of a conductor pair conventionally shown at 69. Thus the work is continually illuminated at the same time that the probes are brought over it and lowered to a position of utilization.

When the invention is used in apparatus of the type whown in FIG. 5, positioning parameters for the probe device may be displayed within the windows 73 and 75, or the like, of control unit 71.

While the invention has been illustrated in connection with a steady state test apparatus, the principles thereof are readily adapted to other contact devices useful for a dynamic testing system. For example, in the latter case, the probe guides 15 could be constructed to have an additional concentric conductive sheath appropriately insulated from the tubular probe guide 15 and electrically connected to external terminals, or the like, to provide the desired dynamic electrical characteristics of coaxial conductor circuits.

While the invention has been described and shown particularly with reference to one of its preferred embodiments, it will be understood by those skilled in the art to which the work is directed that various changes in form and detail may be made without in any way departing from either the spirit or scope of what has been here embodied.

What is claimed is:

1. An electrical test probe assembly comprising,
 a support housing,
 at least one conductive guide cylinder fixedly supported by said housing,
 a flexible conductive probe wire, or the like, within and in electrical contact with said guide cylinder,
 said probe wire having a portion protruding a predetermined length beyond one end of said guide cylinder for contacting an electrical device to be tested,
 said probe wire being bendable within said cylinder to make contact with the interior of said guide cylinder in a region proximate said protruding portion of said wire when subjected to a longitudinal compression force,
 a pressure plate mounted on said housing in abutting relation with a second end of said probe wire remote from said protruding portion for holding said probe wire against longitudinal displacement within said guide cylinder upon application of a longitudinal compression force to the protruding end of said wire whereby said probe wire is caused to make contact with said guide cylinder in a region proximate said one end of said guide cylinder proximate said protruding portion of said probe wire, and
 a circuit board mounted on said housing intermediate the ends of said guide cylinders, said connector means further including means for making individual electrical connections with said guide cylinders to said external circuits.

* * * * *